United States Patent
Dahlberg et al.

(10) Patent No.: US 9,894,012 B2
(45) Date of Patent: Feb. 13, 2018

(54) METHOD AND SYSTEM TO IMPROVE NETWORK CONNECTION LOCALITY ON MULTICORE SYSTEMS

(71) Applicant: Wind River Systems, Inc., Alameda, CA (US)

(72) Inventors: Erik Dahlberg, Stockholm (SE); Rikard Mendel, Stockholm (SE); Jonas Rendel, Stockholm (SE)

(73) Assignee: WIND RIVER SYSTEMS, INC., Alameda, CA (US)

( * ) Notice: Subject to any disclaimer, the term of this patent is extended or adjusted under 35 U.S.C. 154(b) by 564 days.

(21) Appl. No.: 14/149,432

(22) Filed: Jan. 7, 2014

(65) Prior Publication Data
US 2015/0195122 A1 Jul. 9, 2015

(51) Int. Cl.
*H04L 12/931* (2013.01)
*H04L 12/26* (2006.01)

(52) U.S. Cl.
CPC ............ *H04L 49/00* (2013.01); *H04L 43/026* (2013.01)

(58) Field of Classification Search
None
See application file for complete search history.

(56) References Cited

U.S. PATENT DOCUMENTS

| | | | |
|---|---|---|---|
| 2006/0056406 A1* | 3/2006 | Bouchard | H04L 12/56 370/389 |
| 2006/0198381 A1* | 9/2006 | Elangovan | H04L 45/00 370/400 |
| 2013/0019069 A1* | 1/2013 | Yamashita | G06F 9/5016 711/149 |
| 2013/0235881 A1* | 9/2013 | Sharma | H04L 49/1507 370/419 |

* cited by examiner

*Primary Examiner* — Angela Nguyen
(74) *Attorney, Agent, or Firm* — Fay Kaplun & Marcin, LLP

(57) ABSTRACT

A method including selecting a prospective local port from a plurality of available local ports for a computing environment; determining a hash value based on the prospective local port, the hash value being further determined based on a hash value determination method of a network interface of the computing environment; determining whether the hash value results in incoming traffic being delivered to a selected one of a plurality of cores of the computing environment; and sending data relating to an application executed by the selected core over the network interface using the prospective local port, if the hash value results in incoming traffic being delivered to the selected core.

20 Claims, 2 Drawing Sheets

METHOD AND SYSTEM TO IMPROVE NETWORK CONNECTION LOCALITY ON MULTICORE SYSTEMS

BACKGROUND

Modern high-performance computing systems often include multiple processing cores, each of which may execute different software applications or tasks. Such software applications may often require network connectivity over a network interface that is shared by the various processing cores. It may be advantageous to ensure that incoming traffic over the network interface relating to a given software application is routed to the core that is running that software application in the most efficient way possible.

SUMMARY OF THE INVENTION

A method includes selecting a prospective local port from a plurality of available local ports for a computing environment. The method also includes determining a hash value based on the prospective local port. The hash value is also determined based on a hash value determination method of a network interface of the computing environment. The method also includes determining whether the hash value results in incoming traffic being delivered to a selected one of a plurality of cores of the computing environment. The method also includes and sending data relating to an application executed by the selected core over the network interface using the prospective local port, if the hash value results in incoming traffic being delivered to the selected core.

A system includes a network interface, a memory storing a software application and a set of instructions, and a plurality of processing cores. One of the processing cores executes the software application and executes the set of instructions to perform operations including selecting a prospective local port from a plurality of available local ports of the network interface. The operations also include determining a hash value based on the prospective local port. The hash value is further determined based on a hash value determination method of the network interface. The operations also include determining whether the hash value results in incoming traffic being delivered to the one of the processing cores. The operations also include sending data relating to the software application over the network interface using the prospective local port, if the hash value results in incoming traffic being delivered to the one of the processing cores.

A non-transitory computer-readable storage medium stores a set of instructions executable by a processor. The set of instructions, when executed by the processor, causes the processor to perform a method including selecting a prospective local port from a plurality of available local ports for a computing environment. The method also includes determining a hash value based on the prospective local port. The hash value is further determined based on a hash value determination method of a network interface of the computing environment. The method also includes determining whether the hash value results in incoming traffic being delivered to a selected one of a plurality of cores of the computing environment. The method also includes sending data relating to an application executed by the selected core over the network interface using the prospective local port, if the hash value results in incoming traffic being delivered to the selected core.

DETAILED DESCRIPTION

Figure 1:
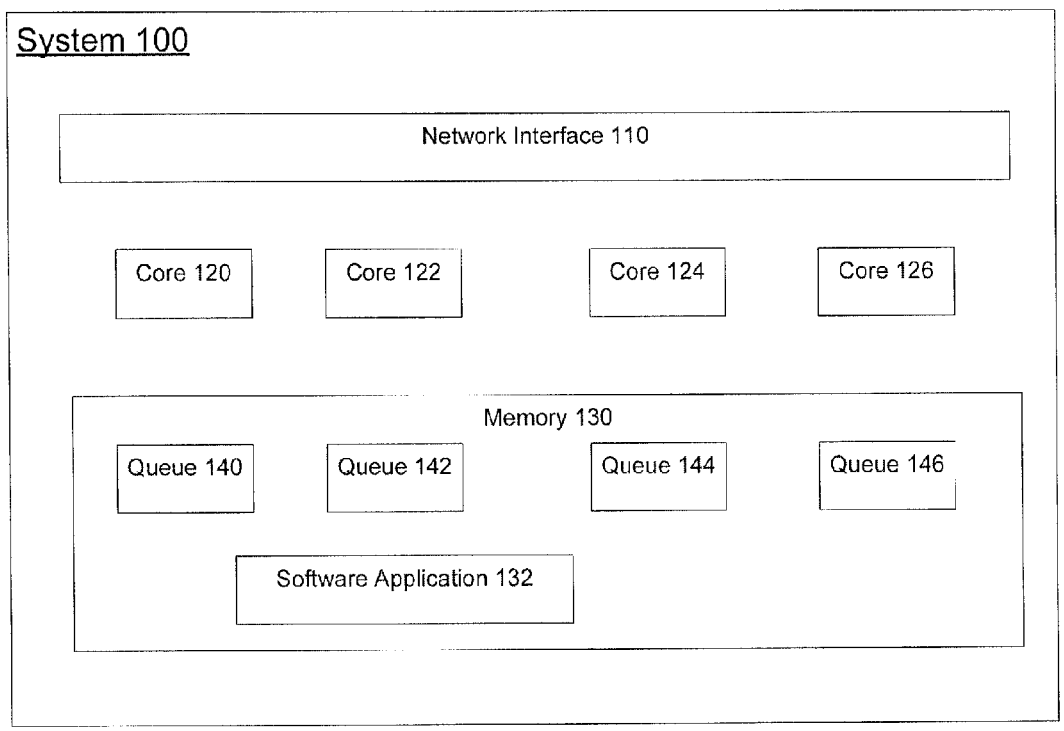
FIG. 1 shows a schematic view of a multi-core system that may have transparent network acceleration techniques applied thereto according to an exemplary embodiment.

The exemplary embodiments may be further understood with reference to the following description and the related appended drawings, wherein like elements are provided with the same reference numerals. Specifically, the exemplary embodiments relate to methods and systems for accomplishing transparent acceleration of networking performance in a multi-core computing system.

Modern software typically requires network connectivity for a wide variety of tasks, from the initial procurement of software and validation of installations, to the acquisition of various types of content, to the sharing of user-generated content. Thus, a typical computing environment may simultaneously execute multiple applications requiring network access for a variety of tasks. As a result, improved network performance has benefits including increased efficiency and a more pleasant user experience. Additionally, modern computing systems typically include multiple processing cores, either in the form of multiple physical cores or multiple virtual cores, to improve the level of performance for all tasks, including network tasks. In such systems, performance is typically better when cores operate more independently, as time is not wasted waiting for access to shared resources, synchronizing shared memory areas, etc.

Networking-related tasks are an area that generally suffers degraded system performance. Typically, packets received via a network interface are sorted into a plurality of queues, one queue corresponding to each core, based on a hash value that is computed using a five-tuple including source address, source port, destination address, destination port, and protocol. The source address may typically be the source (i.e., the local system) IP address, and the destination address and destination port may be properties of the remote host; the protocol may be the protocol that is appropriate for the network flow. The source port may typically be randomly selected from all available local ports.

However, it will be apparent to those of skill in the art that a hash value based on this five-tuple is only exemplary, and that the broader principles described herein may be equally applicable to any sorting method that maps received packets to queues in a pre-defined way based on data within the packets. Generally, a hash value may refer to any predefined transformation that receives a variable input and returns a fixed-size output. In one alternative embodiment, rather than the five-tuple mentioned above, a hash value may be computed based on a subset of the five elements comprising the five-tuple. In another alternative embodiment using the Internet Protocol Security ("IPsec") protocol suite and Encapsulating Security Payloads ("ESP"), the Identifier for ESP Packets ("SPI") may be selected purposefully in the manner described hereinafter in order to provide for the desired sorting.

Packets are taken from each queue by the corresponding processor and acted upon; however, because the distribution of data to the various queues is essentially random, multiple cores may receive and process packets relating to a single network flow. As a result, data relating to the same flow needs to be shared between multiple cores, requiring synchronization that is costly in terms of processing time. Therefore, it may be desirable to ensure that traffic relating to a single flow is all directed to a single core.

Previous efforts to accomplish such direction include the use of dedicated "flow configurator" hardware that is configured at runtime to direct flows to specific cores, or the configuration of common resources with appropriate properties to direct flows to specific cores without changing the configuration of hardware. However, in either case, access to common memory areas is required, resulting in performance penalties as noted above. The exemplary embodiments may enable routing of all received packets from the same network flow to the same core without incurring such penalties.

FIG. 1 schematically illustrates a system 100 that implements transparent network acceleration according to an exemplary embodiment. The system 100 includes a network interface 110, which may be any type of interface that may enable the transmission of data to, and receipt of data from, a remote computing system. This may include, for example, an Ethernet interface, a wireless local area network interface (e.g., using an 802.11 protocol), a wireless personal area network interface (e.g., using a Bluetooth protocol), or any other type of wired or wireless network interface.

The system 100 also includes processing cores 120, 122, 124 and 126 that may execute tasks that involve sending and receiving of data via the network interface 110. Those of skill in the art will understand that the illustration of four cores is only exemplary, and that the broader principles described by the exemplary embodiments may be equally applicable to systems with any number of processing cores. Additionally, as noted above, the processing cores 120, 122, 124 and 126 may be separate physical processing cores, virtual processing cores, or a combination thereof.

The system also includes a memory 130 that may encompass both storage (e.g., a hard drive, distributed storage, etc.) and active memory (e.g., RAM, cache memory, etc.). The memory 130 includes, among other data, software application 132 that requires access to a network via network interface 110. The memory 130 may also include queues 140, 142, 144 and 146, into which packets received via the network interface 110 may be placed. As noted above, the network interface 110 may sort received packets into the queues 140, 142, 144 and 146 using a hash value that is determined based on the five-tuple including source address, source port, destination address, destination port, and protocol. Each of the queues 140, 142, 144 and 146 may correspond to one of the cores, and may have packets retrieved therefrom by the corresponding core; for example, core 120 may retrieve packets from queue 140, core 122 may retrieve packets from queue 142, core 124 may retrieve packets from queue 144, and core 126 may retrieve packets from queue 146.

Figure 2:
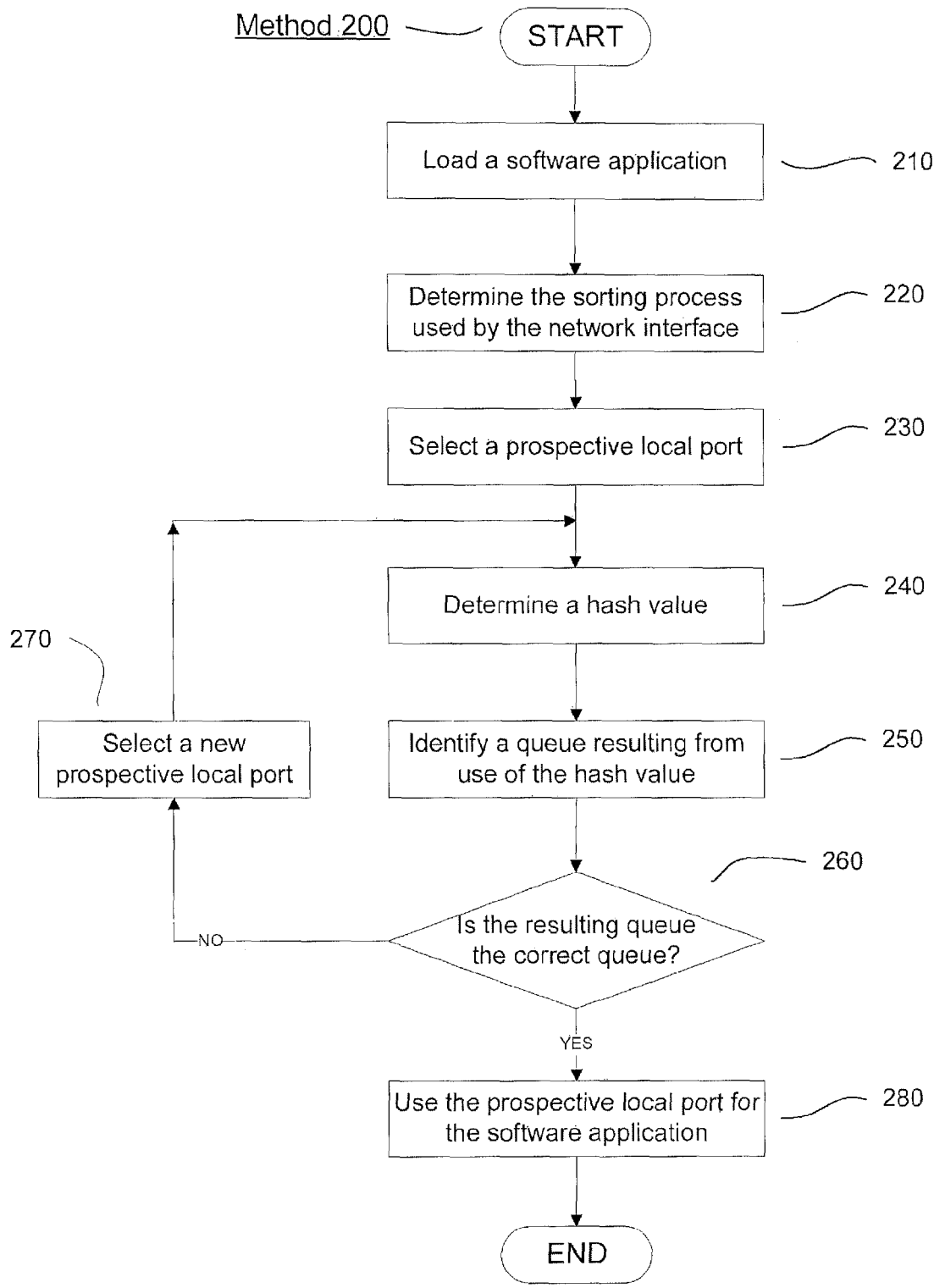
FIG. 2 shows an exemplary method for implementing transparent network acceleration in a multi-core system.

FIG. 2 illustrates a method 200 for transparent network acceleration according to an exemplary embodiment. In step 210, software application 132 is initiated by one of the cores; the method 200 will be described with reference to core 120 but those of skill in the art will understand that this is only exemplary. Additionally, those of skill in the art will understand that the software application 132 initiated in step 210 may be any type of software application involving connectivity with a destination via the network interface 110.

In step 220, the core 120 determines the manner in which the network interface 110 sorts incoming traffic. Those of skill in the art will understand that this may involve requesting relevant information from the network interface 110. Alternately, the core 120 may already possess such information from, for example, a previous performance of method 200, and may be able to retrieve the information from, for example, a memory that is dedicated to the core 120. As noted above, the network interface 110 may typically sort traffic by determining a hash value based on the five-tuple including source address, source port, destination address, destination port, and protocol, and may place incoming traffic into one of the queues 140, 142, 144 and 146 based on the hash value, e.g., based on a last digit of the hash value. However, the exemplary embodiments are not limited to this type of sorting process. The processing cores in step 220 may determine the sorting process used by the network interface without regard to the particular type of sorting.

As described above, the exemplary embodiments involve directing incoming traffic for the software application 132 being executed by the core 120 into the queue corresponding to the core 120, e.g., queue 140, in order that all packets relating to the software application 132 are routed to core 120. To accomplish this, in step 230, the core 120 selects a prospective local port from the range of available local ports. The prospective local port selected in this step may be, for example, the first available local port.

In step 240, the core 120 determines a hash value based on the five-tuple including source address, the source port which is the prospective local port selected in step 230, destination address, destination port, and protocol. This determination may be made by the same methodology as is used by the network interface 110, using the information that is determined in step 220 above. In this manner, the hash value that is determined in step 240 is the same as the hash value that would be determined by the network interface 110 when incoming traffic relating to the software application 132 is received, if the prospective local port selected above in step 230 were to be used for outgoing traffic sent by the core 120 relating to software application 132. Again, if the network interface 110 uses a different sorting method, the core 120 in step 240 would determine the hash value or other type of value related to the particular selected port and sorting method.

In step 250, the core 120 determines which of the queues 140, 142, 144 or 146 would be the recipient of incoming traffic having the hash value determined in step 240, using the sorting methodology used by the network interface 110. As above, this determination is made using the information that is determined by the core 120 in step 220 above. In step 260, the core 120 determines whether the incoming traffic would be sorted into the correct queue (e.g., using the current example, queue 140 that has been described as corresponding to core 120; for a software application being executed by core 122, the correct queue would be queue 142 that has been described as corresponding to core 122, etc.) based on the prospective local port selected in step 230 and the sorting methodology applied by the network interface 110.

If, in step 260, it is determined that the prospective local port currently under consideration would result in incoming traffic being sorted into an incorrect queue, then the method continues to step 270. In step 270, a new prospective local port is selected. The new prospective local port may be, for example, the sequentially next available local port after the one that was previously considered in steps 240-260. Following step 270, the method returns to step 240, at which point the evaluation of the suitability of the new prospective local port begins and proceeds in the manner described above with reference to steps 240-260.

In contrast, if, in step 260, it is determined that the prospective local port currently under consideration would result in incoming traffic being sorted into the correct queue (e.g., for the core 120, into queue 140), then the method continues to step 280. In step 280, the prospective local port is selected for use for traffic relating to the application 132 being executed by the core 120. After this selection has been made, the method 200 terminates. Thus, all outgoing traffic relating to the application 132 being executed by core 120 will use, as its source port, the local port selected in this manner. It will be apparent to those of skill in the art that this will result in incoming traffic destined for the application 132 being placed into queue 140 and, thereby, routed to core 120.

Therefore, the exemplary embodiments make a purposeful selection of a local port for a software application being executed by one core of a multi-core system, rather than the typical random selection, in order to predetermine the queue into which traffic returned from a remote system will be placed. As a result of this predetermination, such traffic will be placed in the queue corresponding to the same core that is executing the application. No resource sharing or synchronization are required between cores in order to ensure that received packets are provided to the correct core.

As described above, this has the effect of providing improved performance as compared to a multi-core system in which packets are randomly routed to different cores as a result of arbitrary local port selection. Overall, processing performance may scale substantially linearly with the number of cores because the various cores within the multi-tore system may process packets substantially independently from one another. This may be described as a "transparent" acceleration method because, to a remote computing system receiving traffic from a computing system employing this method, there is no indication that the source port has been selected in the meaningful manner described above rather than in the typical arbitrary manner, and the remote computing system simply responds to the received traffic in the same manner as it normally would. This may further be termed "transparent" because the network hardware of the system employing the method need not operate any differently, or be configured any differently, than normal, but may simply route received packets in its normal manner, and the local port selected by the originating core will result in the received packets being placed in the queue corresponding to the same core.

Those of skill in the art will understand that the above-described exemplary embodiments may be implemented in any number of matters, including as a software module, as a combination of hardware and software, etc. For example, the exemplary method 200 may be embodied in a program stored in a non-transitory storage medium and containing lines of code that, when compiled, may be executed by a processor.

It will be apparent to those skilled in the art that various modifications may be made to the exemplary embodiments, without departing from the spirit or the scope of the invention. Thus, it is intended that the present invention cover modifications and variations of this invention provided they come within the scope of the appended claims and their equivalents.

What is claimed is:

1. A method, comprising:
selecting, by a core executing an application, a prospective local port from a plurality of available local ports for a computing environment, wherein the core is one of a plurality of cores of the computing environment;
determining a hash value for incoming traffic, prior to the reception of the incoming traffic, based on a hash value determination method of a network interface of the computing environment, wherein the hash value determination method is based on a source port and wherein determining the hash value is based on the prospective local port being utilized as the source port;
determining whether the hash value would result in the incoming traffic being delivered to the core executing the application; and
sending, without synchronizing, all outgoing packets relating to the application executed by the core over the network interface using the prospective local port, if the hash value would result in incoming traffic being delivered to the core.

2. The method of claim 1, further comprising:
selecting a further prospective local port from the plurality of available local ports; if the hash value does not result in incoming traffic being delivered to the core;
determining a further hash for the incoming traffic, prior to the reception of the incoming traffic, based on the hash value determination method, wherein determining the further hash value is based on the further prospective local port being utilized as the source port;
determining whether the further hash value would result in incoming traffic being delivered to the core; and
sending data relating to the application over the network interface using the further prospective local port, if the further hash value results in incoming traffic being delivered to the core.

3. The method of claim 1, wherein the prospective local port is selected as one of a random selection and a first one of the plurality of available local ports.

4. The method of claim 1, wherein the hash value is determined based on the prospective local port and one of a local address, a remote port, a remote address, and a protocol.

5. The method of claim 1, wherein determining whether the hash value would result in incoming traffic being delivered to the core comprises:
identifying one of a plurality of queues, the identified queue corresponding to the hash value; and
determining whether the core corresponds to the identified queue.

6. The method of claim 1, wherein the plurality of cores comprises one of physical cores and virtual cores.

7. The method of claim 4, wherein the hash value is determined based on a five-tuple comprising the prospective local port, the local address, the remote port, the remote address, and the protocol.

8. The method of claim 4, wherein the local address and the remote address are IP addresses.

9. The method of claim 5, wherein the plurality of queues are stored within a memory of the computing environment.

10. The method of claim 5, wherein each of the plurality of queues corresponds to one of the plurality of cores.

11. A system, comprising:
a network interface;
a memory storing a software application and a set of instructions; and
a plurality of processing cores,
wherein one of the processing cores executes the software application and further executes the set of instructions to perform operations comprising:

selecting a prospective local port from a plurality of available local ports of the network interface;

determining a hash value for incoming traffic, prior to the reception of incoming traffic, based on a hash value determination method of the network interface, wherein the hash value determination method of the network interface is based on a source port and wherein determining the hash value is based on the prospective local port being utilized as the source port;

determining whether the hash value would result in the incoming traffic being delivered to the one of the processing cores; and sending, without synchronizing, all outgoing packets relating to the application executed by the one of the processing cores over the network interface using the prospective local port, if the hash value results in incoming traffic being delivered to the one of the processing cores.

12. The system of claim 11, wherein the operations further comprise:

selecting a further prospective local port from the plurality of available local ports, if the hash value does not result in incoming traffic being delivered to the one of the processing cores;

determining a further hash value for the incoming traffic, prior to the reception of the incoming traffic, based on the hash value determination method wherein the further hash value is based on the further prospective local port being utilized as the source port;

determining whether the further hash value would result in the incoming traffic being delivered to the one of the processing cores; and sending data relating to the software application over the network interface using the further prospective local port, if the further hash value results in incoming traffic being delivered to the one of the processing cores.

13. The system of claim 11, wherein the plurality of processing cores comprises one of physical cores and virtual cores.

14. The system of claim 11, wherein the prospective local port is selected as one of a random selection and a first one of the plurality of available local ports.

15. The system of claim 11, wherein determining whether the hash value would result in incoming traffic being delivered to the one of the processing cores comprises:

identifying one of a plurality of queues, the identified queue corresponding to the hash value; and determining whether the one of the processing cores corresponds to the identified queue.

16. The system of claim 11, wherein the hash value is determined based on the prospective local port and one of a local address, a remote port, a remote address, and a protocol.

17. The system of claim 15, wherein the plurality of queues are stored within the memory.

18. The system of claim 15, wherein each of the plurality of queues corresponds to one of the plurality of processing cores.

19. The system of claim 16, wherein the local address and the remote address are IP addresses.

20. A non-transitory computer-readable storage medium storing a set of instructions executable by a processor, the set of instructions, when executed by the processor, causing the processor to perform a method comprising:

selecting, by a core executing an application, a prospective local port from a plurality of available local ports, wherein the core is one of a plurality of cores of the computing environment;

determining a hash value for incoming traffic, prior to the reception of the incoming traffic, based on a hash value determination method of a network interface of the computing environment, wherein the has value determination method is based on a source port and wherein determining the hash value is based on the prospective local port being utilized as the source port;

determining whether the hash value would result in the incoming traffic being delivered to the core executing the application; and sending, without synchronizing, all outgoing packets relating to the application executed by the core over the network interface using the prospective local port, if the hash value would result in incoming traffic being delivered to the core.

* * * * *